Dec. 16, 1958   M. MAYER   2,864,415
WORK FEEDING AND GUIDING DEVICE FOR SHAPING MACHINES
Filed Feb. 19, 1957   2 Sheets-Sheet 1

INVENTOR.
Max Mayer
BY Barthel + Bugbee
Attys

Dec. 16, 1958 M. MAYER 2,864,415
WORK FEEDING AND GUIDING DEVICE FOR SHAPING MACHINES
Filed Feb. 19, 1957 2 Sheets-Sheet 2
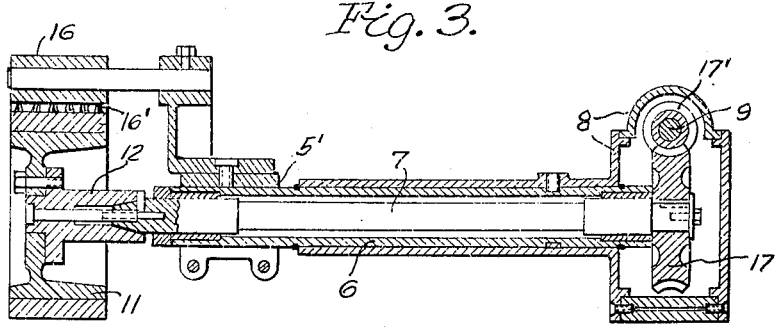
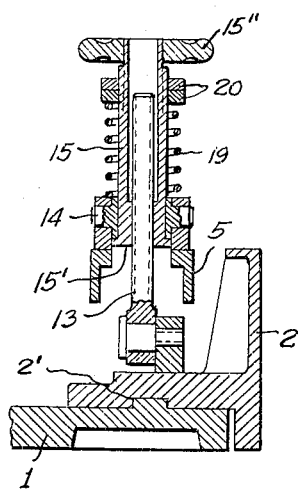
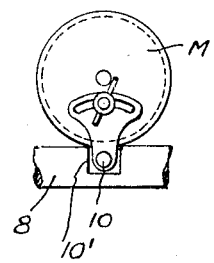
INVENTOR.
Max Mayer
BY Barthel & Bugbee
Attys United States Patent Office 2,864,415
Patented Dec. 16, 1958

2,864,415

WORK FEEDING AND GUIDING DEVICE FOR SHAPING MACHINES

Max Mayer, Neu-Ulm (Danube), Germany

Application February 19, 1957, Serial No. 641,103

6 Claims. (Cl. 144—246)

This invention relates to wood working machines and, in particular, to shaping machines, also known as shapers. A shaper, in the woodworking machinery art, is defined as a machine with one or two cutters mounted on vertical revolving spindles and projecting above a flat table, for cutting irregular outlines, moldings and other work.

Hitherto, in wood shaping machines, feeding devices have been provided in which the feed motor, fed roller and driving mechanism have been swingably mounted as a unit upon an upright or column, with the disadvantage that the bulk of this unit obstructed the workman's view of the workpiece being shaped. A further disadvantage thereof lay in the fact that the entire unit had to be swung aside in order to obtain access to the cutter so as to resharpen or replace the cutter. Finally, in such prior devices where it was necessary to run the workpiece two or more times through the machine in order to complete the shaping thereof, it was difficult to remove the workpiece and reinsert it because of the obstruction presented by the feeding device. The present invention eliminates these disadvantages of prior shaping machines and possesses additional advantages as set forth in the following objects.

Accordingly, one object of the invention is to provide a work feeding and guiding device for shaping machines which is low in height and open in construction, so as to constantly provide free access to the cutter, to the feed rollers and to the workpiece without the necessity of moving the device to the side in order to obtain said accessibility.

Another object is to provide a feeding and guiding device of the foregoing character wherein means is provided for yieldingly pressing the workpiece downward against the shaper table at longitudinally-spaced locations on the workpiece as the workpiece is moved forward past the rotary shaping cutter by a pair of yieldably mounted positively-driven spaced feed rollers.

Another object is to provide a work feeding and guiding device of the foregoing character wherein the feed rollers are mounted upon vertically-swinging arms pivoted to guide plates or stop plates, thereby adapting the feed rollers to follow variations in the top contour or height of the workpiece.

Another object is to provide a work feeding and guiding device of the foregoing character wherein the guide plates or stop plates are slidably adjustable toward or away from one another along a sub-base toward or away from the cutter, thereby enabling the inner vertical edges of the guide plates to be positioned as closely as possible to the cutter and thereby regulate the width of the gap therebetween through which the cutter projects.

Another object is to provide a work feeding and guiding device of the foregoing character wherein the inner guide plate edges are provided with replaceable wear strips of soft non-metallic material such as plastic, in order to prevent damage to the cutter or to the guide plates in the event that they collide with one another.

Another object is to provide a work feeding and guiding device of the foregoing character wherein the swinging feed roller arms are provided with thrust springs having adjusting means enabling the thrust of the spring and consequently the pressure of the feed roller against the workpiece to be varied.

Another object is to provide a work feeding and guiding device of the foregoing character wherein the two feed roller drive shafts are maintained accurately parallel to one another even when the rollers are positioned at different heights above the shaper table, and wherein mechanism is provided which drivingly interconnects these shafts in all their positions of adjustment.

Another object is to provide a work feeding and guiding device of the foregoing character wherein the feed roller shafts are angled slightly relatively to the plane of the guide plates in order to cause the feed rollers to exert a crowding effect which urges the workpiece against the guide plates while it is being fed past the guide plates by the feed rollers.

Another object is to provide a work feeding and guiding device of the foregoing character wherein the driving motor and speed reduction mechanism for the feed roller shafts is mounted upon one of the feed roller shaft bearing housings so as to rise and fall as a unit with the feed roller thereof.

Another object is to provide a work feeding and guiding device of the foregoing character wherein the feed roller driving shafts are drivingly interconnected by a cross shaft arranged with a longitudinal sliding driving connection therebetween so as to simultaneously drive the two feed roller shafts while enabling them to rise and fall independently of one another.

Another object is to provide a work feeding and guiding device as set forth above in which the weight of the driving motor is at least partially counterbalanced by a spring also mounted upon the same feed roller bearing housing.

Another object is to provide a work feeding and guiding device as set forth in the object immediately preceding, wherein the driving motor is tiltably mounted on a supporting rod to facilitate tightening of the driving belt of the speed reduction mechanism.

Another object is to provide a work feeding and guiding device of the foregoing character wherein a wiper brush is mounted adjacent each feed roller for cleaning the surface thereof and removing resinous chips and other foreign matter therefrom.

Another object is to provide a work feeding and guiding device of the foregoing character wherein chip deflector plates are mounted perpendicularly to the guide plates or stop plates near their adjacent edges in order to retain the chips as well as to protect the workman from injury by accidental contact with the cutter.

Other objects and advantages of the invention will become apparent during the course of the following description of the accompanying drawings, wherein:

Figure 3 is a vertical longitudinal section through one of the feed roller drive shafts taken along the line III—III in Figure 2;

Figure 4 is a vertical section through the feed roller height and thrust adjusting mechanism, taken along the line IV—IV in Figure 1; and Figure 5 is a fragmentary side elevation of the driving motor and its mount for varying the belt tension, looking from the right-hand side of Figures 1 and 2.

Figure 1:
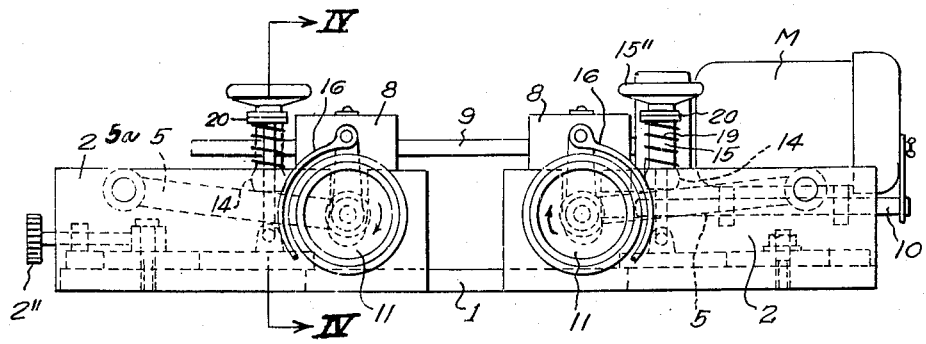
Figure 1 is a front elevation of a work feeding and guiding device for shaping machines, according to one form of the invention.
Figure 2:
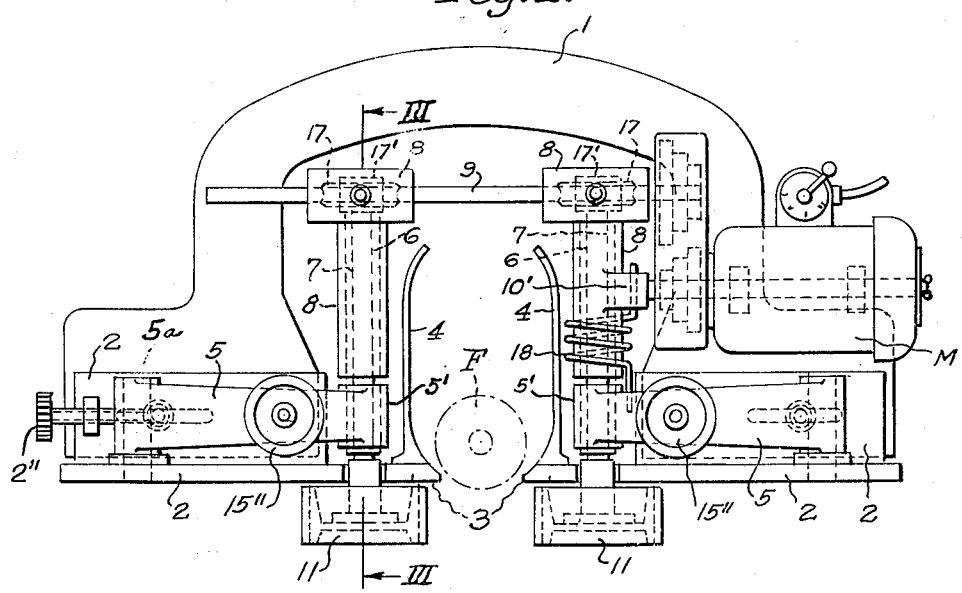
Figure 2 is a top plan view of the feeding and guiding device shown in Figure 1.

Referring to the drawings in detail, Figures 1 and 2 show a work feeding and guiding device for shaping machines having a base 1 adapted to be mounted upon and bolted or otherwise secured to the top surface of the work table of a conventional shaping machine or shaper. Such shaping machines are well known in the woodworking art and their details are beyond the scope of the present invention. Such a machine is provided with a rotary cutter F, shown in dotted lines in Figure 2 and rotatably mounted upon a vertical shaft which is driven by the shaper drive mechanism (not shown).

The base 1 (Figure 2) is of roughly C-shaped outline when viewed from above, with forward end portions spaced apart from one another and interconnected by a rearward bridge portion. The forward end portions of the base 1 are provided with rectilinear guide ribs 2' fitting the correspondingly-grooved bottom surfaces of guide plates or stop plates 2 of approximately L-shaped cross-section (Figure 4). The right-hand or work entering guide plate 2 of Figure 2 is slotted and provided with a clamping bolt through the slot in order to provide a coarse adjustment of the right-hand guide plate 2 relatively to the base 1 and cutter F. The left-hand or work-leaving guide plate 2 is similarly slotted and provided with an anchor stud extending from the base 1 through the slot and pivotally holding the inner end of a screw shaft engaged by a hand wheel nut 2'' rotatably mounted on the left-hand or leading guide plate 2 so that rotation of the hand wheel nut 2'' moves the left-hand guide plate 2 back and forth along its respective guide rib 2' in order to adjust its position relatively to the cutter F.

The inner or adjacent vertical edges of the guide plates 2 are provided with replaceable wear strips 3 (Figure 2) of soft material, such as plastic or fiber, so as to prevent damage either to the cutter F or to the guide plates 2 in the event the latter are accidentally moved into engagement with the former. Vertical chip deflector plates 4 are secured to the vertical portions of the guide plates 2 adjacent the wear strip 3 and extend rearwardly therefrom (Figure 2) so as to enclose the space on opposite sides of the cutter F to contain the chips as well as to protect the workman from injury by accidental contact with the cutter F.

Near their outer ends, the guide plates 2 (Figures 1 and 2) carry rearwardly-projecting horizontal pivot pins 5a upon which the outer ends of swinging feed roller arms 5 are pivotally mounted. The inner ends of the swinging arms 5 are provided with bearing bosses 5' which support the forward ends of elongated feed roller shaft sleeve bearings 6 in which feed roller shafts 7 are rotatably mounted. The feed roller shafts 7 are disposed substantially parallel to one another but are tilted slightly in a horizontal plane about 2 degrees out of perpendicularity to the front surfaces of their respective guide plates 2 in order to provide a slight crowding effect of the workpiece against the guide plates or stop plates 2, as explained below. Thus, in Figure 2, the axes of rotation of the shafts 7 are displaced slightly to the right of lines perpendicular to the plates 2 at their points of intersection with the forward ends of these axes or rotation.

Tiltably mounted upon each feed roller shaft sleeve bearing 6 is a forward tubular portion of a gear housing 8 (Figure 3), through the rearward box-like portion of which passes a cross shaft 9 having a longitudinal groove or keyway therein and drivingly interconnecting the parallel feed roller driving shafts 7 by means of the worm gearing described below. The forward tubular portion of the right-hand housing 8 (Figure 2) is provided with a laterally-projecting bored boss 10' in which is secured the inner end of a motor supporting pivot rod 10. Tiltably mounted upon the pivot rod 10 by parallel ears depending therefrom (Figures 1, 2 and 5) is an electric driving motor M, preferably of a reversible rotating field type. The motor M is drivingly connected to the cross shaft 9 by a belt and stepped pulleys (Figure 2), the tightness of the belt being adjusted by swinging the motor M back and forth on the supporting pivot rod 10 and locking it in its adjusted position by the wing nut shown in the arcuately-slotted end plate on the rod 10 in Figure 5.

Secured to the forward end of each feed roller drive shaft 7, as by a set screw and mating tapers (Figure 3) is a removable hub 12 to which is bolted a removable rotary feed roller 11. Tiltably mounted upon the horizontal portion of each guide plate or stop plate 2 (Figure 4) is the lower end of a vertically-tiltable screw shaft 13, the upper portion of which is threaded into an internally and externally threaded tubular nut 15 having a retaining flange 15' by which it is held in retention in a trunnion bearing 14 tiltably mounted on the swinging arm 5 above a hole therein through which the screw shaft 13 and tubular nut 15 pass. The portion of the arm 5 in which the trunnion bearing 14 is mounted is bored transversely to receive the trunnion pins of the trunnion bearing 14 so as to permit self-adjusting rocking of the tubular nut 15 relatively to the swinging arm 5 and tiltable screw shaft 13. Mounted on the upper end of the tubular nut 15 is a hand wheel 15'' by which the nut 15 is rotated in order to vary the thrust of a thrust spring 19 which encircles the tubular nut 15 between an abutment washer on the upper end of the trunnion bearing 14 and a pair of abutment nuts 20 threaded onto the upper portion of the externally-threaded tubular nut 15 above the thrust spring 19.

The periphery of each feed roller 11 is provided with an annular layer or rim of rubber-like material in order to increase its frictional gripping engagement with the workpiece. Adhesion of the resinous chips given off by wooden workpieces is prevented by a brush 16' mounted above each feed roller 11 in engagement with the periphery thereof and supported by an arcuate protective guard or cover 16 (Figure 3) which in turn is supported by a bracket secured to the boss 5', on the end of each swinging arm 5.

Drivingly mounted upon the rearward end of each feed roller drive shaft 7 within the casing 8 is a worm wheel 17 (Figure 3) with which meshes a worm 17' drivingly connected to the cross shaft 9. One of the worms 17, such as the right-hand worm in Figure 2, is fixedly secured to the cross shaft 9, whereas the other or left-hand worm is drivingly connected to the cross shaft 9 by a key which slidably engages the longitudinal keyway in the left-hand end of the cross shaft 9 so as to maintain a driving connection therebetween while permitting rise and fall of the feed roller shafts 7 on their swinging arms 5 and consequently permitting separation of the shafts 7 relatively to one another during operation. The weight of the motor M and its speed reduction stepped pulleys is at least partly counterbalanced by a torsion spring 18 (Figure 2), encircling the adjacent forward tubular portion of its respective housing 8. The rearward end of the counterbalancing spring 18 is anchored in the boss 10' whereas the forward end is seated in the adjacent swinging arm 5 near the outer or free end 5' thereof.

In the operation of the invention, let it be assumed that the feeding and guiding device shown in Figures 1 and 2 has been bolted or otherwise secured to the work table of a shaping machine with the shaping machine cutter F on its vertical shaft extending into the gap between the wear strips 3 at the inner ends of the guide plates or stop plates 2. The stop plates 2 are adjusted longitudinally along their respective guide ribs 2' by the coarse adjustment on the right-hand side of Figure 2 and the fine adjustment on the left-hand side thereof provided by the hand wheel nut 2'' and its associated screw shaft. The clamping bolts or nuts therein provided are then tightened to clamp the guide plates or stop plates 2 in their adjusted positions with the wear strips 3 closely adjacent the periphery of the rotary cutter F.

Let it also be assumed that the motor has been connected to a source of electric current, as by the cable leading from the switch shown at the right-hand end of Figure 2. To adjust the feed rollers 11 to the particular workpiece, the workman selects such a workpiece and moves it underneath the feed rollers 11, tightening or loosening the hand wheels 15″ until the thrusts of the thrust springs 19 are satisfactory as regards the pressure of the feed rollers 11 upon the workpiece.

Meanwhile, during this adjustment, the arms 5 swing upward or downward on their pivot pins, causing their shafts 7, shaft bearings 6 and gear housings 8 to consequently rise and fall. As this occurs, the worm 17′ in the left-hand gear casing 8 (Figure 2) slides longitudinally along the cross shaft 9 while maintaining a driving connection therewith through its key slidably engaging the keyway in the cross shaft 9, and the feed roll driving shafts 7 remain accurately parallel to one another at different levels.

With the machine and feeding and guiding device thus prepared for operation, the operator starts the motor of the shaping machine in operation, consequently rotating the cutter F on its vertical shaft. He then operates the switch to start the motor M, causing the cross shafts 9 to rotate through the belt drive between the stepped pulleys. The rotation of the cross shaft 9 rotates the worms 17′ drivingly connected to it and these in turn rotate the worm wheels 17, feed roller shafts 7 and feed rollers 11 at reduced speeds. The operator then pushes a workpiece along the vertical surface of the entering guide plate 2 until it engages and pushes upward the entering feed roller 11. The frictional rubber-like periphery of the feed roller 11 engages and moves the workpiece forward into engagement with the cutter F past the gap between the wear strips 3 until the forward end of the workpiece engages the leaving feed roller 11 which pulls it away from the cutter F along the leaving guide plate 2 and out of the machine.

The chips resulting from the engagement of the cutter F with each workpiece are ejected into the space between the chip deflector plates 4. Due to the slight tilting of the axes of rotation of the feed roll shafts 7 horizontally relatively to the vertical abutment surfaces of the guide plates or stop plates 2, as explained above, the feed rollers 11 exert a crowding effect upon the workpiece, thereby pressing it firmly against the guide plates 2 as it passes therealong. Since the motor M is a reversible motor and the switch shown a reversing switch, it is possible to reverse the direction of rotation of the feeding rollers 11 so as to cause the workpiece to move either forward or backward along the guide plates 2. As the feed rollers 11 revolve, the brushes 16′ remove from their peripheries any chips, resin or pitch which would otherwise adhere thereto after being given off by the workpieces.

What I claim is:

1. In a shaping machine having a work table provided with a power-operated cutter rotatably mounted upon a vertical shaft, a workpiece guiding and feeding device comprising an open-centered base adapted to rest upon the table and having a bridge portion with spaced end portions thereon adapted to be disposed on opposite sides of the cutter, said end portions having elongated rectilinear guideways thereon disposed substantially parallel to the intended direction of travel of the workpiece past the cutter, a pair of slides slidably mounted respectively upon said pair of guideways for independent sliding adjustment toward and away from one another and having upstanding guide portions with vertical workpiece guide surfaces thereon disposed in substantially the same vertical plane, a pair of horizontally-disposed pivot elements mounted near the outer ends of said guide portions, a pair of feed roller supporting arms having their outer ends pivotally mounted respectively on said pivot elements and directed toward one another with their inner ends having shaft bearings thereon disposed upon substantially horizontal parallel axes, a pair of substantially parallel feed roller shafts mounted respectively in said shaft bearings, a pair of feed rollers mounted respectively on the ends of said shafts adjacent said vertical workpiece guide surfaces, an adjusting device mounted on each slide and engaging each arm for adjustably swinging said arm and the feed roller thereon vertically toward and away from said base, a driving motor, and power-transmitting mechanism drivingly connecting said motor to said feed roller shafts while permitting independent vertical adjustment thereof relatively to one another.

2. A workpiece guiding and feeding device, according to claim 1, wherein a motor supporting structure is pivotally mounted upon one of said feed roller shafts and wherein said motor is mounted on said motor supporting structure.

3. A workpiece guiding and feeding device, according to claim 2, wherein resilient motor weight counterbalancing means is connected between said motor supporting structure and the feed roller supporting arm supporting the feed roller shaft upon which said motor supporting structure is pivotally mounted.

4. A workpiece guiding and feeding device, according to claim 3, wherein said resilient means comprises a torsion spring encircling a portion of said motor supporting structure.

5. A workpiece guiding and feeding device, according to claim 2, wherein said motor supporting structure includes a motor supporting pivot rod disposed substantially perpendicular to the axis of the feed roller shaft upon which said structure is pivotally mounted, and wherein said motor is tiltably mounted upon an axis of tilt substantially perpendicular to the pivot axis of said motor supporting structure upon its respective feed roller shaft.

6. A workpiece guiding and feeding device, according to claim 1, wherein said upstanding guide portions have vertically-elongated openings therethrough disposed in alignment with said feed roller shafts and wherein said feed roller shafts pass through said openings and swing upward and downward therein.

References Cited in the file of this patent

UNITED STATES PATENTS

| | | |
|---|---|---|
| 124,267 | Heyser | Mar. 5, 1872 |
| 501,554 | Wilson | July 18, 1893 |
| 817,943 | Waltz | Apr. 17, 1906 |
| 1,942,834 | Railley | Jan. 9, 1934 |
| 2,076,511 | Hedgpeth | Apr. 6, 1937 |
| 2,332,888 | Bostwick et al. | Oct. 26, 1943 |
| 2,615,483 | King | Oct. 28, 1952 |
| 2,646,088 | Smith | July 21, 1953 |
| 2,687,153 | Moore | Aug. 24, 1954 |
| 2,744,550 | Knapp | May 8, 1956 |
| 2,776,679 | King | Jan. 8, 1957 |

FOREIGN PATENTS

| | | |
|---|---|---|
| 182,777 | Switzerland | May 16, 1936 |
| 472,656 | Italy | June 27, 1952 |
| 623,090 | Germany | Dec. 13, 1935 |